US009307217B1

(12) United States Patent
Day

(10) Patent No.: US 9,307,217 B1
(45) Date of Patent: Apr. 5, 2016

(54) PORTABLE VIDEO CAMERA/RECORDER HAVING VIDEO SECURITY FEATURE

(71) Applicant: Ambarella, Inc., Santa Clara, CA (US)

(72) Inventor: Christopher N. Day, Los Gatos, CA (US)

(73) Assignee: Ambarella, Inc., Santa Clara, CA (US)

( * ) Notice: Subject to any disclaimer, the term of this patent is extended or adjusted under 35 U.S.C. 154(b) by 52 days.

(21) Appl. No.: 13/915,862

(22) Filed: Jun. 12, 2013

(51) Int. Cl.
*H04N 5/77* (2006.01)
*H04N 9/79* (2006.01)

(52) U.S. Cl.
CPC ....... *H04N 9/79* (2013.01)

(58) Field of Classification Search
CPC ....... G08B 25/016; H04N 1/00151
USPC ....... 386/228, 224
See application file for complete search history.

(56) References Cited

U.S. PATENT DOCUMENTS

| | | | | |
|---|---|---|---|---|
| 6,510,325 | B1 * | 1/2003 | Mack et al. | 455/575.2 |
| 2003/0157960 | A1 * | 8/2003 | Kennedy | 455/556 |
| 2011/0032979 | A1 * | 2/2011 | Matsuo et al. | 375/240.01 |
| 2012/0041675 | A1 * | 2/2012 | Juliver et al. | 701/465 |
| 2014/0032718 | A1 * | 1/2014 | Berger et al. | 709/219 |
| 2014/0057590 | A1 * | 2/2014 | Romero | 455/404.2 |
| 2014/0313336 | A1 * | 10/2014 | Predmore, II | 348/148 |

* cited by examiner

*Primary Examiner* — Hung Dang
*Assistant Examiner* — Girumsew Wendmagegn
(74) *Attorney, Agent, or Firm* — Christopher P. Maiorana, PC

(57) ABSTRACT

An apparatus includes a camera, a memory, and a control circuit. The camera may be configured to generate a first video stream having a first bitrate and a second video stream having a second bitrate. The second bitrate may be lower than the first bitrate. The memory may be configured to store the first video stream and the second video stream. The control circuit may be configured to upload the second video stream from the memory to a user device via a wireless protocol in response to at least one predetermined emergency-related event.

19 Claims, 5 Drawing Sheets

100
102
LENS
104
SENSOR
106
ENCODER
120
RES_1
RES_2
110
MEM
I/F
112
MEMORY
(NVM,
RAM,
ETC.)
108
CONTROL
114
WIRELESS
I/F
122
116
EVENT DETECTOR
118a
PANIC
BUTTON
118b
PRESSURE
SENSOR
118n-1
NVM
REMOVAL
118n
NOISE
DETECTOR

PORTABLE VIDEO CAMERA/RECORDER HAVING VIDEO SECURITY FEATURE

FIELD OF THE INVENTION

The present invention relates to video surveillance generally and, more particularly, to a portable video camera/recorder that includes a video security feature.

BACKGROUND OF THE INVENTION

Portable video cameras/recorders (such as used in automotive applications) capture video footage in memory or on flash cards within the camera. The cards can be removed to upload the video to a personal computer (PC) for playback or for uploading to the Internet. A limitation of conventional cameras is that the camera itself can be stolen or broken, or the flash card can be removed and stolen, leaving no record of the video recording.

It would be desirable to implement a portable video camera/recorder that includes a video security feature.

SUMMARY OF THE INVENTION

The present invention concerns an apparatus including a camera, a memory, and a control circuit. The camera may be configured to generate a first video stream having a first bitrate and a second video stream having a second bitrate. The second bitrate may be lower than the first bitrate. The memory may be configured to store the first video stream and the second video stream. The control circuit may be configured to upload at least a portion of the second video stream from the memory to a user device via a wireless protocol in response to at least one predetermined emergency-related event.

The objects, features and advantages of the present invention include providing a portable video camera/recorder that includes a video security feature that may (i) transfer a video file in response to a "panic button" being pressed, (ii) transfer a video file in response to the camera itself being removed from a mounting location, (iii) transfer a video file in response to an SD-card being removed, (iv) transfer a video file in response to a user initiating a file transfer from another device, (v) transfer a video file in response to a predetermined audio input level and/or audio profile, and/or (vi) be configured to transfer a video file and/or stream using a wireless protocol.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
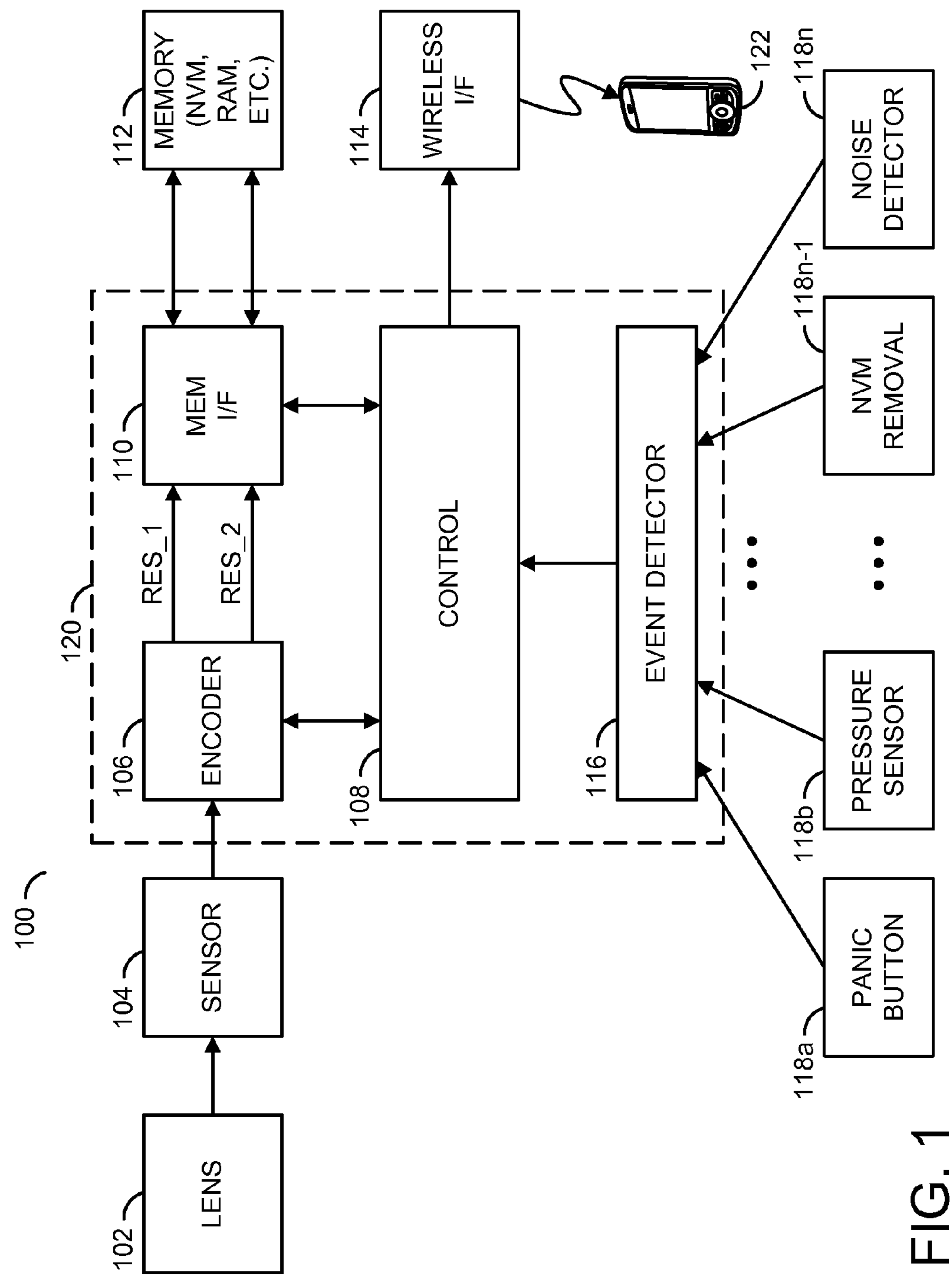
FIG. 1 is a diagram illustrating a video camera/recorder system in accordance with an embodiment of the present invention.

Referring to FIG. 1, a block diagram of a device 100 illustrating a video camera/recorder system in accordance with an embodiment of the present invention. In one example, the device (or apparatus) 100 may comprises a block (or circuit) 102, a block (or circuit) 104, a block (or circuit) 106, a block (or circuit) 108, a block (or circuit) 110, a block (or circuit) 112, a block (or circuit) 114, a block (or circuit) 116 and a number of blocks (or circuits) **118*a*-118*n*. The blocks 106-118*n*** may be implemented in hardware, software, firmware or any combination thereof in multiple apparatuses (or devices).

The device 100 may be implemented as a high-resolution (or high-definition) video camera/recorder. The device 100 may be operational to capture one or more high-bitrate (e.g., high resolution, etc.) video streams (or clips) and corresponding lower bitrate (e.g., lower resolution, lower frame rate, higher predicted frames to reference frame ratio, altered quantization parameters, etc.) video streams (or clips) using the block 102 (e.g., a lens and associated actuator(s)) and the block 104 (e.g., an electro-optical sensor). The high-bitrate video streams (e.g., RES_1) and the lower bitrate video streams (e.g., RES_2) may be generated (e.g., processed, encoded, compressed, etc.) by the block 106 (e.g., an encoder). The block 106 may be operational to generate, process, and encode the video streams RES_1 and RES_2 using one or more proprietary and/or standard still and/or video codecs (e.g., JPEG, MJPEG, MPEG-2, MPEG-4, H.264, HEVC, etc.). The low-bitrate video clips may contain the same content captured at the same time from the same point of view as the corresponding high-bitrate video clips. In some embodiments, the low-bitrate video clips may be a downscaled copy of the high-bitrate video clips. In other embodiments, the low-bitrate video clips and the high-bitrate video clips may be captured in parallel. For example, each frame captured by the block 106 may be processed as high-bitrate video and processed as downscaled low-bitrate video. In some embodiments, the low-bitrate video stream may be generated from the high-bitrate video stream through transcoding. For example, the higher bitrate stream may be decoded and then re-encoded into the lower bitrate stream.

The block 108 (e.g., a control circuit) may be configured to manage the block 106 and the block 110 (e.g., a memory interface) to store the video streams RES_1 and RES_2 in the block 112 (e.g., a memory). The block 112 may be implemented using various volatile (e.g., SRAM, DRAM, etc.) and/or non-volatile (e.g., flash, SD-card, xD-picture card, subscriber identity module (SIM) card, etc.) memory technologies. The block 108 may be further configured to communicate (e.g., transfer) at least a portion (e.g., a video stream, one or more short video clips, one or more still pictures, etc.) of the low-bitrate video data stored in the block 112 to an external device (e.g., a user device 122) via the block 114 (e.g., a wireless communication interface). For example, the block 114 may be configured to support one or more of Bluetooth, ZigBee, IEEE 802.11, IEEE 802.15, IEEE 802.15.1, IEEE 802.15.2, IEEE 802.15.3, IEEE 802.15.4, IEEE 802.15.5, and/or IEEE 802.20. The block 108 may be configured to initiate the transfer of the low-bitrate video data in response to a signal from the block 116 (e.g., an event detector). The block 116 may be configured to generate the signal in response to at least one of a number of predetermined emergency-related events occurring. In various embodiments, the occurrence of the predetermined events may be detected using the blocks **118*a*-118*n* (e.g., a panic button, a pressure sensor, a noise detector, a memory removal detector, etc.). In some embodiments, the block 108 may be configured to transfer a live version of the low-bitrate video stream in addition to the stored portion being transferred from the block 112. In some embodiments, the blocks 106, 108, 110, and 116 may be implemented together as a processor 120**.

In some embodiments, the device 100 is implemented as a camera including wireless (e.g., WiFi, Bluetooth, etc.) connectivity. The addition of WiFi or Bluetooth wireless connectivity into the device 100 allows the device 100 to send video and/or still images wirelessly to the user device 122 (e.g., a smart-phone, tablet, PDS, etc.), which can then upload the video and/or still images to a remote location (e.g., the Internet, a secure server, a cloud computer, a security service, a police department, etc.). For example, the user device 122 may implement one or more protocols (e.g., GSM, CDMA, GPRS, UMTS, CDMA2000, 3GPP LTE, etc.) associated with cellular telephone networks. By uploading the video and/or still images to the Internet/Cloud via the user device 122, the video data is preserved in cases where the camera or memory (e.g., flash) card is stolen.

A concern with streaming the video from the device 100 to the user device 122 includes a need to continue recording during streaming. Additionally, the video data needs to be uploaded quickly to the Internet/Cloud before the camera is stolen or the memory card removed. The video security feature in accordance with an embodiment of the present invention leverages dual-stream video encoding to record at least two streams, one with a first bitrate (e.g., at full high definition (HD) resolution) and one with a second bitrate (e.g., at a lower resolution, etc.). Both video streams are stored on the memory (e.g., SD-card, etc.) of the device 100. The lower bitrate stream can be sent concurrently (in parallel) with the recording and generally takes less time than the higher bitrate stream to upload to the Internet/Cloud.

In various embodiments, the transfer of the video data from the memory to the user device 122 occurs automatically in response to a predetermined emergency-related event. In one example, the video data may be transferred when the camera user presses a "panic button" on the camera or in some other convenient location (e.g., on a steering wheel, on a key fob, etc.). In another example, the video data may be transferred when the camera itself is removed from a mounting location (e.g., a windshield, vehicle dashboard, building wall or other structure, helmet, etc.). In still another example, the video data may be transferred when the memory card is removed. In addition to emergency-related events, the video data may be transferred when the user initiates (or requests) a file transfer from the user device 122 (e.g., smart-phone, tablet, PDA, etc.).

In response to the occurrence of an emergency-related event, the device 100 automatically communicates with an application on the user device 122 and sends at least a portion (e.g., the last seconds) of the previously recorded lower bitrate video stream (or clip or still images) to the user device 122. The video stream may be uploaded in a series of smaller video clips to maximize the amount of video sent to the Internet/Cloud prior to the connection being lost. The video data may be sent as a number of still images also. The application on the user device 122 stores the video data received from the camera and automatically uploads the video data to the Internet/Cloud, where the video data is saved for future inspection. By initiating the transfer of the video data in response to occurrence of an emergency-related event rather than continuously uploading data, a video camera/recording system in accordance with an embodiment of the present invention generally ensures preservation of a record of the event, while minimizing costs related to the use of the user device to upload the video data to the Internet/Cloud. Such costs may include, but are not limited to, air time and/or data fees, storage space fees, reduced performance of the user device due to resource sharing needed to support a continuous upload, reduced battery life, cell network congestion, etc.

Figure 2:
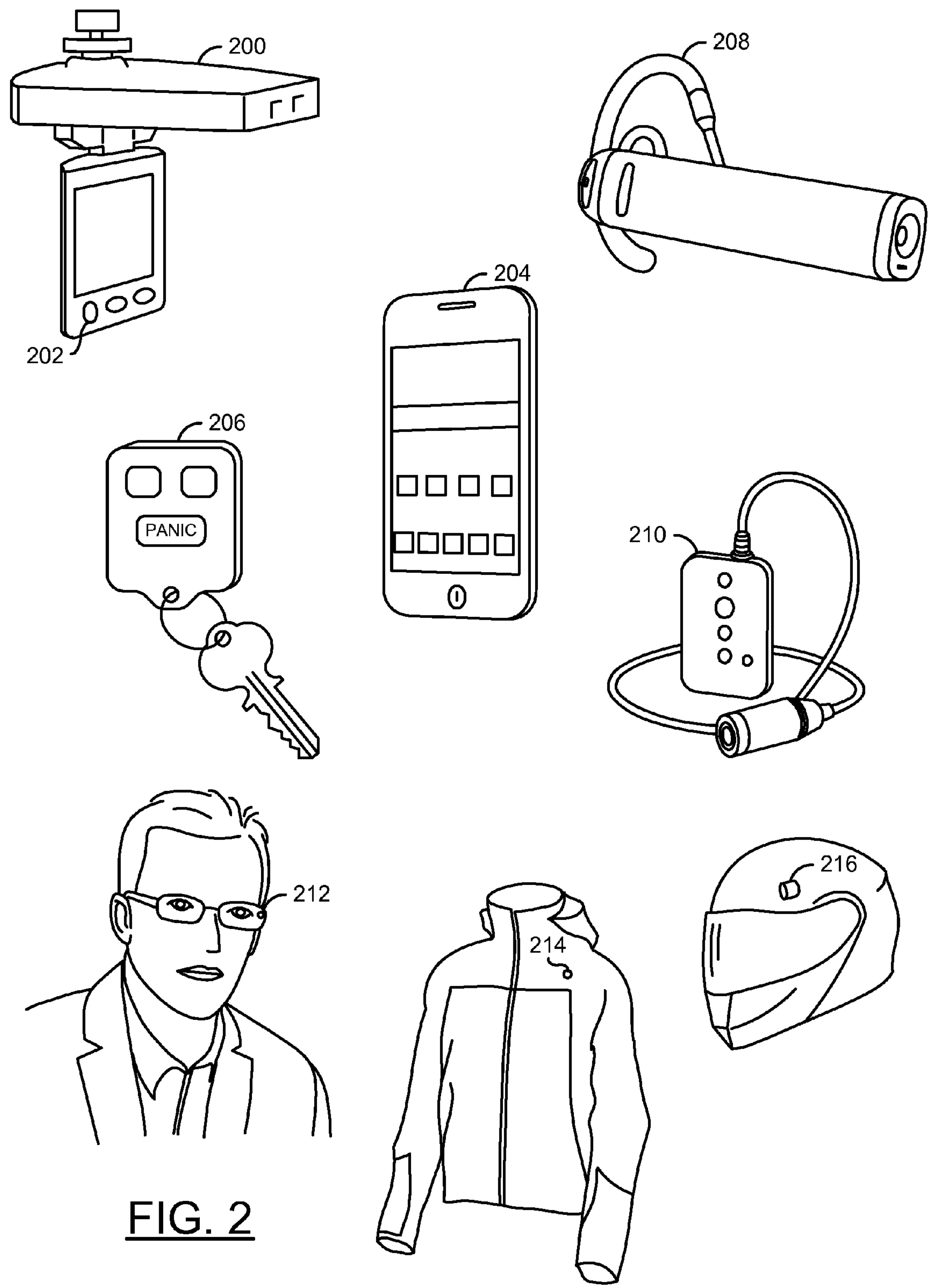
FIG. 2 is a diagram illustrating example applications of the video camera/recorder system of FIG. 1.

Referring to FIG. 2, a diagram is shown illustrating various embodiment of the video camera/recorder device 100 of FIG. 1. In one example, the device 100 may be implemented as part of a dash camera (or dashcam) 200. The dashcam 200 may be configured to be mounted on or near a windshield of a vehicle. The dashcam 200 may include a panic button 202. The dashcam 200 may be configured to continuously record video and serve, for example, as a "black box" recorder. For example, the dashcam 200 may be used to record video footage relating to (i) car accidents, (ii) bogus accident scams, (iii) threatening behavior by assailants, (iv) interactions with police, and/or (v) operation and surroundings of the vehicle in general.

In response to the panic button 202 being pressed, the dashcam 200 transfers at least a portion of a recorded video clip to a user device 204 (e.g., a cellular telephone, smart phone, tablet computer, personal digital assistant (PDA), etc.) using a wireless protocol. In some embodiments, the panic button 202 is disposed in a location other than on the dashcam 200. For example, the panic button 202 may be located on a steering wheel, vehicle dashboard, key fob 206, etc. Locating the panic button 202 in a location other than on the dashcam 200 generally allows the security feature in accordance with an embodiment of the present invention to be activated more discretely.

The video camera/recorder system of FIG. 1 may also be applied in a personal security context. For example, various implementations of the device 100 of FIG. 1 may include, but are not limited to, a wearable camera 208 that can be worn on an ear, a wearable camera 210 that can be hidden on a person, a camera 212 that can be mounted on a pair of eyeglasses, a camera 214 that can be mounted on an article of clothing (e.g., jacket, shirt, etc.), and a camera 216 that can be attached to a helmet. The cameras 208, 210, 212, 214, and 216 may be configured similarly to the dashcam 200 to transfer at least a portion of a recorded video clip to the user device 204 in response to a respective panic button being pressed. The camera/recorder system in accordance with an embodiment of the present invention, when applied in the personal security context, may be configured to continuously record video footage relating, for example, to (i) travel logs, (ii) accidents, (iii) threatening behavior by assailants, (iv) interactions with police, and/or (v) surroundings of the user in general. However, other applications of the camera/recorder system of FIG. 1 are contemplated (e.g., mounted to a building wall, etc.).

Figure 3:
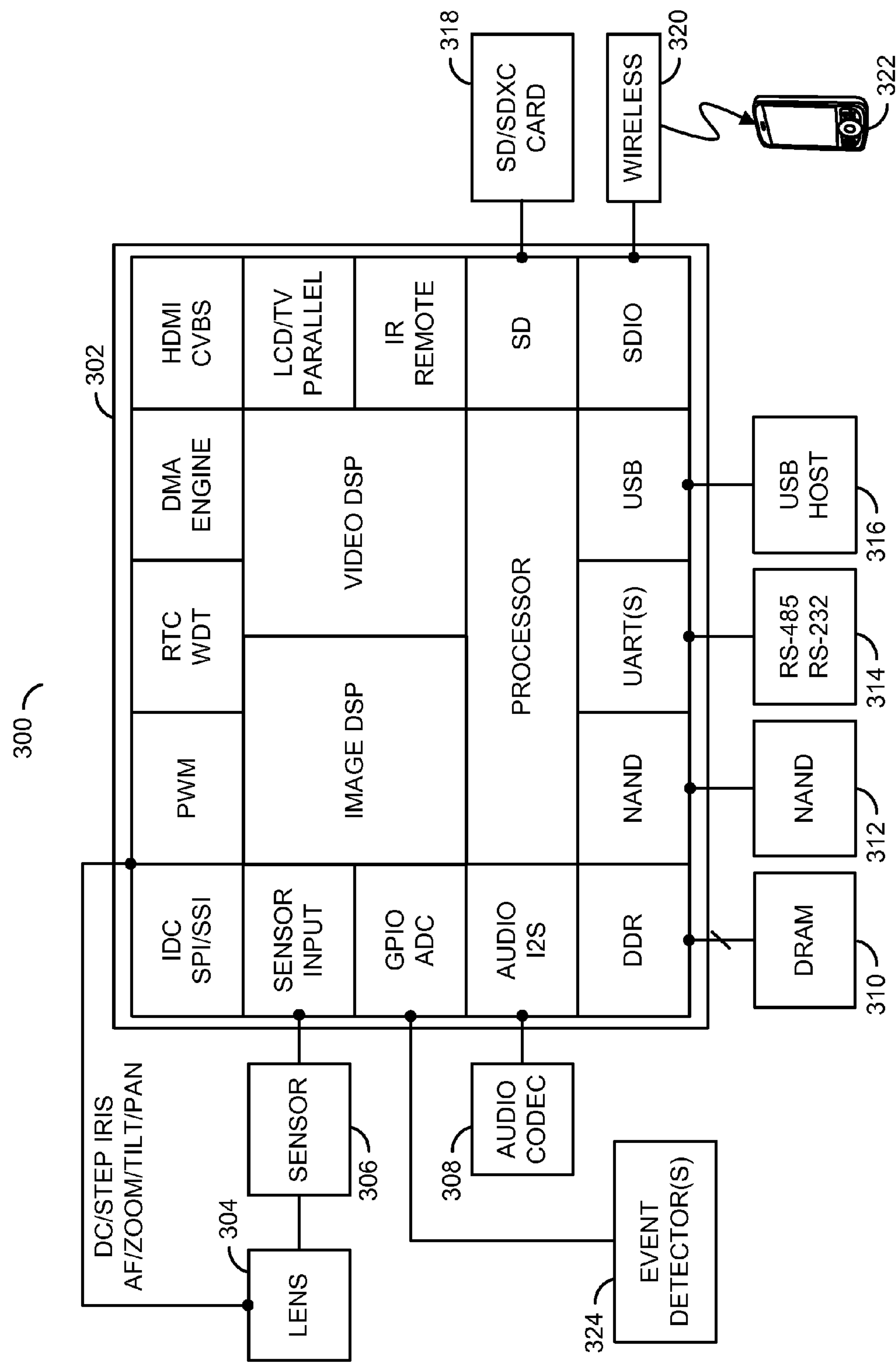
FIG. 3 is a diagram illustrating an example implementation of the video camera/recorder system of FIG. 1.

Referring to FIG. 3, a block diagram of a camera system 300 is shown illustrating an example implementation of a camera/recorder system in accordance with an embodiment of the present invention. In one example, the electronics of the camera system 300 may be implement as one or more integrated circuits. For example, an application specific integrated circuit (ASIC) or system on chip (SOC) may be used to implement the camera system 300. In one example, the camera system 300 may comprise a camera chip (or circuit) 302, a lens assembly 304, an image sensor 306, an audio codec 308, dynamic random access memory (DRAM) 310, non-volatile memory (e.g., NAND flash memory) 312, one or more serial interfaces 314, an interface 316 for connecting to or acting as a USB host, an interface for connecting to a removable media 318 (e.g., SD, SDXC, etc.), a wireless interface 320 for communicating with a portable user device 322, and an interface for communicating with one or more event detectors (sensors) 324.

The main camera circuit 302 may include a number of modules including a pulse width modulation (PWM) module, a real time clock and watch dog timer (RTC/WDT), a direct memory access (DMA) engine, a high-definition multimedia interface (HDMI), an LCD/TV/Parallel interface, a general purpose input/output (GPIO) and analog-to-digital converter (ADC) module, an infra-red (IR) remote interface, a secure digital input output (SDIO) interface module, an SD card interface, an audio $I^2S$ interface, an image sensor interface, and a synchronous data communications interface (e.g., IDC SPI/SSI). The circuit 302 may also include an embedded processor (e.g., ARM, etc.), an image digital signal processor (DSP) and a video DSP. The circuit 302 may be configured (e.g., programmed) to control the lens assembly 304 and receive image data from the sensor 306. The wireless interface 320 may include support for wireless communication by one or more wireless protocols such as Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20. The circuit 302 may also include support for communicating using one or more of the universal serial bus protocols (e.g., USE 1.0, 2.0, 3.0, etc.). The circuit 302 may also be configured to be powered via the USB connection. However, other communication and/or power interfaces may be implemented accordingly to meet the design criteria of a particular implementation.

Figure 4:
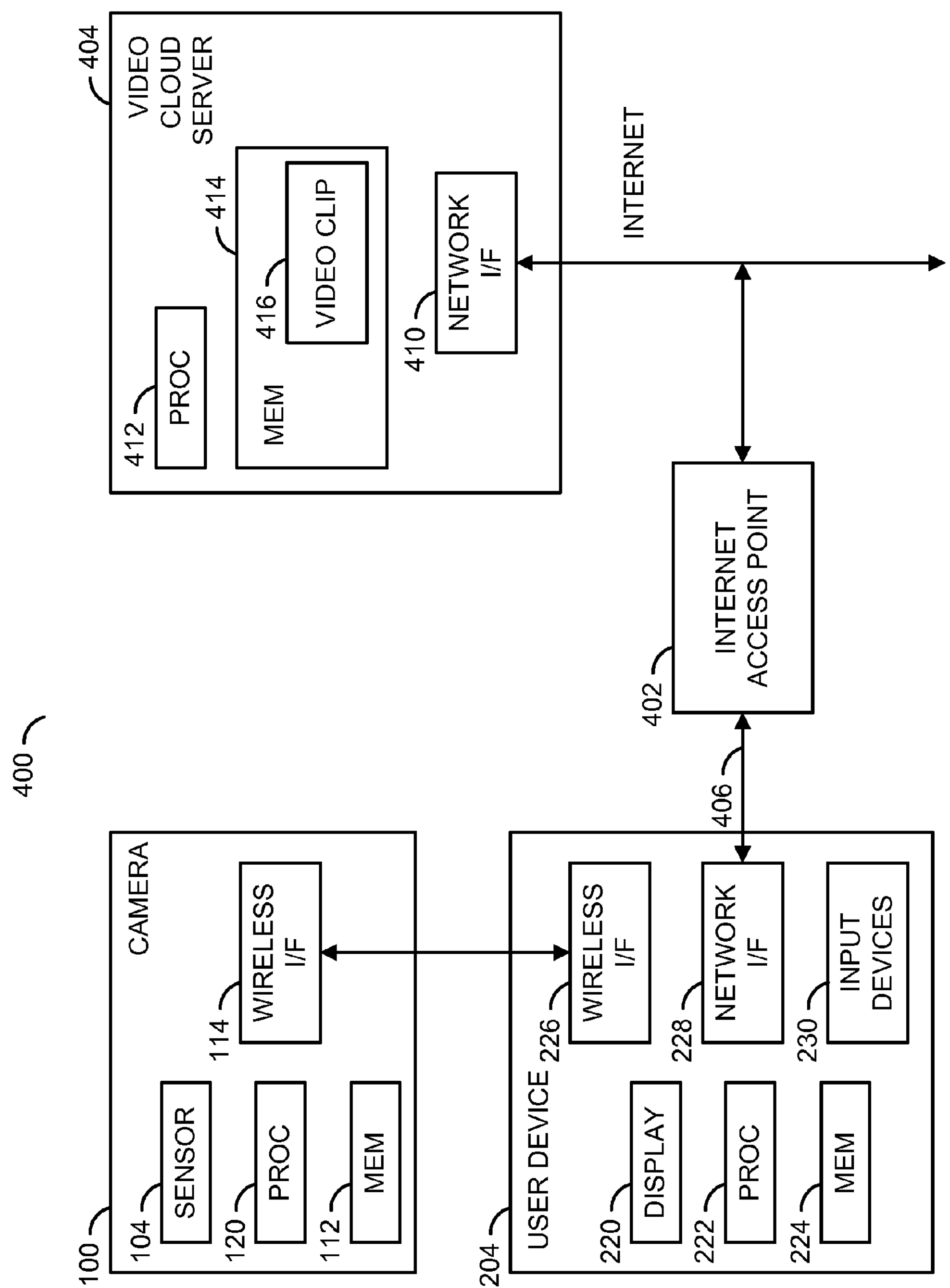
FIG. 4 is a block diagram of a video surveillance system implementing a security feature in accordance with a preferred embodiment of the present invention.

Referring to FIG. 4, a block diagram of a surveillance system 400 is shown. In one example, the surveillance system 400 may include a block (or circuit) 402 (e.g., an Internet access point) and a block (or circuit) 404 (e.g., a video cloud server). The block 404 may implement one or more video cloud servers. In one example, the block 404 may include a block 410 (e.g., a network interface), a block 412 (e.g., a processor), and a block 414 (e.g., a non-volatile storage medium). The non-volatile storage medium may be configured to store video clip 416. The block 414 may be include, but is not limited to, any type of storage media including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic data.

In one example, the system 400 may be configured to operate with the camera/recorder system 100 of FIG. 1 and a user device 204 implementing a video security feature in accordance with a preferred embodiment of the present invention. The camera/recorder system 100 may include a sensor 104, memory 112, a wireless interface (I/F) 114, and a processor 120 (described above in connection with FIG. 1). The user device 204 may include a display 220, a processor 222, memory 224, a wireless interface (I/F) 226, a network interface (I/F) 228, and input devices 230. In response to a predetermined emergency-related event, the camera 100 may transfer low-bitrate video clips to the user device 204 via the wireless interfaces 114 and 226. The user device 204 may be configured to display the videos using the display 220, store the video clips in the memory 224, and/or upload the video clips to the video cloud server 404 via the Internet and a network connection 406 between the network I/F 228 and the internet access point 402.

Figure 5:
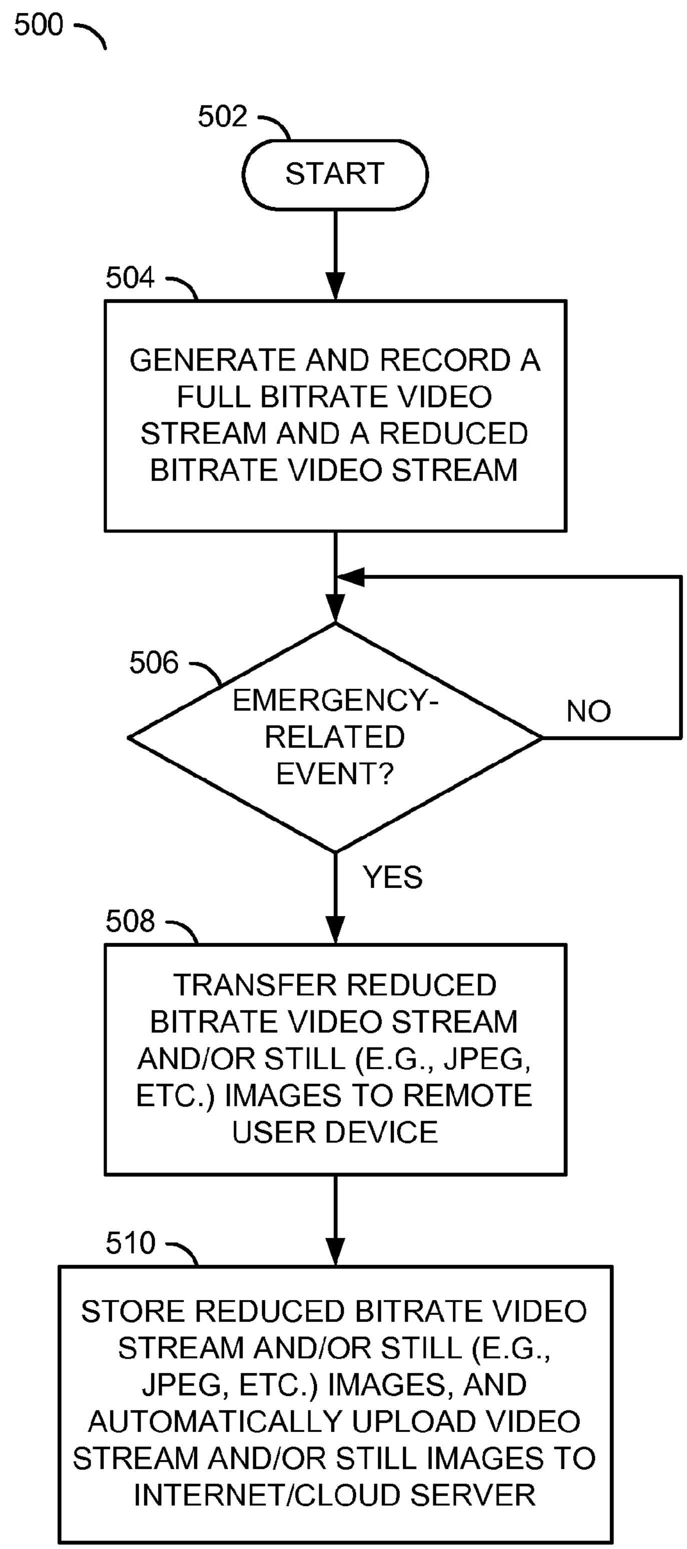
FIG. 5 is a flow diagram illustrating an example process in accordance with an embodiment of the present invention.

Referring to FIG. 5, a flow diagram is shown illustrating an example process 500 in accordance with an embodiment of the present invention. In some embodiments, the process (or method) 500 may comprise a step (or state) 502, a step (or state) 504, a step (or state) 506, a step (or state) 508, and a step (or state) 510. The process 500 generally begins with the step 502 (START) and moves to the step 504. In the step 504, the process 500 generates and records (stores) a full bitrate video stream and a reduced (or lower) bitrate video stream. The reduced bitrate video stream may be generated from or contemporaneously with the full bitrate video stream. While the step 504 is being performed, the process 500 may move to the step 506 to determine whether one or more predetermined emergency-related events has occurred (e.g., a "panic button" is being pressed, the camera itself is being removed from a mounting location, the memory card is being removed, a loud noise is being detected, the sound of glass breaking is being detected, etc.). When no predetermined emergency-related events are being detected, the process 500 remains in the steps 504 and 506.

When a predetermined emergency-related event is detected, the process 500 moves to the step 508, where at least a portion (e.g., short clip or clips, still images, etc.) of the reduced bitrate video stream stored in the step 504 is transferred to a remote user device automatically. In some embodiments, a live reduced bitrate video stream is transferred to the remote user device also. When the portion of the reduced bitrate video stream has been transferred to the user device, the process 500 may move to the step 510. In the step 510, the remote user device is controlled to store and/or upload the reduced bitrate video stream, clips, still images, etc. received in the step 508 to the Internet or a cloud server for preservation of a video record associated with the predetermined emergency-related event.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more integrated circuits, one or more chips or die arranged as flip-chip modules and/or multi-chip modules or by interconnecting an appropriate network of conventional component circuits, as is described herein, modifications of which will be readily apparent to those skilled in the art(s).

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:

a camera configured to generate a first video stream having a first bitrate and a second video stream having a second bitrate, wherein said first and said second video streams are generated in parallel using a single image sensor and said second bitrate is lower than said first bitrate;

a memory configured to store said first video stream and said second video stream; and a control circuit configured to automatically upload a previously recorded portion of said second video stream from said memory to a user device via a wireless protocol in response to said control circuit detecting at least one of (i) said apparatus being removed from a mounted position and (ii) an attempt to remove said memory from said apparatus.

2. The apparatus according to claim 1, wherein said second bitrate is reduced through at least one of lower resolution, lower frame rate, higher predicted frames to reference frame ratio, and change in one or more quantization parameters.

3. The apparatus according to claim 1, wherein said control circuit is further configured to stream said second video stream live from said camera to said user device in addition to uploading said previously recorded portion of the second video stream stored in said memory.

4. The apparatus according to claim 1, wherein said apparatus is further enabled to automatically upload said previously recorded portion of said second video stream in response to at least one of detection of a sound of breaking glass and detection of a loud noise.

5. The apparatus according to claim 1, wherein said apparatus is further enabled to automatically upload said previously recorded portion of said second video stream in response to a panic button located remotely from said camera being pressed.

6. The apparatus according to claim 5, wherein said panic button is located on at least one of a steering wheel, a dashboard, and a key fob.

7. The apparatus according to claim 1, further comprising wireless communication interface supporting one or more of Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20.

8. The apparatus according to claim 1, wherein said apparatus is configured to be mounted on or near one or more of a windshield of a vehicle, a helmet, an article of clothing, a pair of eyeglasses, a building structure.

9. The apparatus according to claim 1, wherein said memory comprises non-volatile memory.

10. The apparatus according to claim 9, wherein said non-volatile memory comprises one or more of a flash memory, an SD card, an xD-picture card, a subscriber identity module (SIM) card.

11. A system comprising:

a camera configured to record a first video stream having a first resolution and a second video stream having a second resolution, wherein said first and said second video streams are generated in parallel using a single image sensor, said second resolution is lower than said first resolution, and said camera is further configured to automatically transmit a previously recorded portion of said second video stream to a user device via a first wireless protocol in response to said camera detecting at least one of (i) an attempt to remove a memory storing said first and said second video streams from said camera and (ii) said camera being removed from a mounted position; and said user device, configured to store said second video stream transmitted by said camera and automatically upload said second video stream to a remote location using a second wireless protocol.

12. The system according to claim 11, wherein said user device comprises at least one of a cellular telephone, a tablet computer, a personal digital assistant.

13. The system according to claim 12, wherein said user device communicates said second video stream to at least one of a secure server, a cloud computer, a security service, a police department.

14. The system according to claim 11, wherein said camera is further configured to automatically transmit said previously recorded portion of said second video stream to said user device via said first wireless protocol in response to at least one of said camera detecting a sound of glass being broken and said camera detecting a loud noise.

15. A method of preserving recorded events comprising:

generating a first video stream having a first bitrate and a second video stream having a second bitrate, wherein said first and said second video streams are generated in parallel using a single image sensor and said second bitrate is lower than said first bitrate;

storing said first video stream and said second video stream in a memory; and in response to a camera embodying said image sensor and said memory storing said first video stream and said second video stream detecting an attempt to remove said memory from said camera, automatically uploading a previously recorded portion of said second video stream from said memory to a user device via a first wireless protocol.

16. The method according to claim 15, further comprising:

uploading said second video stream from said user device to a remote location via a second wireless protocol.

17. The method according to claim 16, wherein said first and said second wireless protocols comprise one or more of Bluetooth, ZigBee, IEEE 802.11, IEEE 802.15, IEEE 802.15.1, IEEE 802.15.2, IEEE 802.15.3, IEEE 802.15.4, IEEE 802.15.5, and IEEE 802.20.

18. The method according to claim 16, wherein said second wireless protocol comprises one or more of GSM, CDMA, GPRS, UMTS, CDMA2000, and 3GPP LTE.

19. The method according to claim 15, further comprising automatically uploading said previously recorded portion of said second video stream from said memory to said user device via said first wireless protocol in response to said camera embodying said image sensor being removed from a mounted position.

* * * * *